US009122444B2

(12) United States Patent
Findlay et al.

(10) Patent No.: US 9,122,444 B2
(45) Date of Patent: Sep. 1, 2015

(54) NETWORK ACCESSIBLE PROJECTORS THAT DISPLAY MULTIPLE CLIENT SCREENS AT ONCE

(75) Inventors: Roland Findlay, San Jose, CA (US); Ronald Marc Conescu, Mountain View, CA (US); Haixia Yu, San Jose, CA (US); Max E. McFarland, Sunnyvale, CA (US); Michael Griffin, Redwood City, CA (US); Jay Dautcher, Santa Cruz, CA (US); Yuko Ihara, San Mateo, CA (US)

(73) Assignee: Ricoh Company, Ltd., Tokyo (JP)

( * ) Notice: Subject to any disclaimer, the term of this patent is extended or adjusted under 35 U.S.C. 154(b) by 433 days.

(21) Appl. No.: 13/369,262

(22) Filed: Feb. 8, 2012

(65) Prior Publication Data
US 2013/0201209 A1    Aug. 8, 2013

(51) Int. Cl.
*G09G 5/00* (2006.01)
*G06F 3/14* (2006.01)
*G09G 5/14* (2006.01)

(52) U.S. Cl.
CPC ............... *G06F 3/1454* (2013.01); *G09G 5/14* (2013.01); *G09G 2360/04* (2013.01); *G09G 2370/06* (2013.01)

(58) Field of Classification Search
CPC ............. G06F 2203/04803; G06F 2203/04806
USPC .................................. 715/733–749; 348/744
See application file for complete search history.

(56) References Cited

U.S. PATENT DOCUMENTS

| | | | |
|---|---|---|---|
| 5,745,711 A | 4/1998 | Kitahara et al. | |
| 5,995,096 A | 11/1999 | Kitahara et al. | |
| 6,437,314 B1 | 8/2002 | Usuda et al. | |
| 6,463,460 B1 | 10/2002 | Simonoff | |
| 6,647,432 B1 * | 11/2003 | Ahmed et al. | 719/318 |
| 6,751,657 B1 * | 6/2004 | Zothner | 709/220 |
| 7,043,529 B1 | 5/2006 | Simonoff | |
| 7,213,051 B2 | 5/2007 | Zhu et al. | |
| 7,225,402 B2 | 5/2007 | Silverbrook et al. | |
| 7,290,210 B2 | 10/2007 | Silverbrook et al. | |

(Continued)

FOREIGN PATENT DOCUMENTS

JP    2006146629 A    6/2006
JP    2009230579 A    10/2009

OTHER PUBLICATIONS

"BrightLink 450Wi Interactive Projector,User's Guide" Epson Exceed Your Vision.

(Continued)

*Primary Examiner* — Ryan R Yang
(74) *Attorney, Agent, or Firm* — Duft Bornsen & Fettig LLP

(57) ABSTRACT

Systems and methods are provided for provisioning, via a projector, client software for accessing the projector from a network. The projector includes a light emitting unit that projects visible light representing image information onto a screen, a network interface, and a control unit. The control unit provides client software to network devices that enables the network devices to interact with the projector, receives input via the network interface from the client software operating on multiple network devices, processes the input from the client software to generate image information for the light emitting unit, and provides the generated image information to the light emitting unit for projection onto the screen.

20 Claims, 6 Drawing Sheets

(56) References Cited

U.S. PATENT DOCUMENTS

| | | | |
|---|---|---|---|
| 7,313,589 B2* | 12/2007 | Tran et al. | 709/203 |
| 7,350,923 B2* | 4/2008 | Olson et al. | 353/30 |
| 7,369,515 B2 | 5/2008 | Salesky et al. | |
| 7,370,269 B1 | 5/2008 | Prabhu et al. | |
| 7,391,910 B2 | 6/2008 | Ratnakar et al. | |
| 7,421,069 B2 | 9/2008 | Vernon et al. | |
| 7,433,327 B2 | 10/2008 | Harville et al. | |
| 7,434,166 B2* | 10/2008 | Acharya et al. | 715/740 |
| 7,508,977 B2* | 3/2009 | Lyons et al. | 382/154 |
| 7,516,579 B2 | 4/2009 | Kreyenborg et al. | |
| 7,523,399 B2* | 4/2009 | Britt et al. | 715/748 |
| 7,627,630 B2* | 12/2009 | Chang et al. | 709/204 |
| 7,634,540 B2 | 12/2009 | Ivashin et al. | |
| 7,716,273 B2 | 5/2010 | Soin et al. | |
| 7,716,344 B2 | 5/2010 | Salesky et al. | |
| 7,761,510 B2 | 7/2010 | Watanabe et al. | |
| 7,813,304 B2 | 10/2010 | Salesky et al. | |
| 7,814,559 B2 | 10/2010 | Horikiri | |
| 7,840,596 B2 | 11/2010 | Geyer et al. | |
| 7,856,473 B2 | 12/2010 | Horikiri et al. | |
| 7,880,719 B2 | 2/2011 | Kritt et al. | |
| 7,934,002 B2 | 4/2011 | Salesky et al. | |
| 7,945,622 B1 | 5/2011 | Pegg | |
| 7,962,525 B2 | 6/2011 | Kansal | |
| 8,275,197 B2 | 9/2012 | Hawkins et al. | |
| 8,661,331 B2 | 2/2014 | Martin et al. | |
| 8,862,731 B2 | 10/2014 | Leung et al. | |
| 2003/0028637 A1 | 2/2003 | Gross | |
| 2003/0218597 A1 | 11/2003 | Hodzic et al. | |
| 2004/0194021 A1 | 9/2004 | Marshall et al. | |
| 2005/0094111 A1* | 5/2005 | May | 353/98 |
| 2006/0206564 A1 | 9/2006 | Burns et al. | |
| 2008/0183820 A1 | 7/2008 | Golovchinsky et al. | |
| 2010/0042931 A1* | 2/2010 | Dixon et al. | 715/738 |
| 2010/0060803 A1* | 3/2010 | Slack et al. | 348/744 |
| 2010/0103379 A1* | 4/2010 | Fiess | 353/7 |
| 2010/0251142 A1 | 9/2010 | Geppert et al. | |
| 2010/0321170 A1* | 12/2010 | Cooper et al. | 340/425.5 |
| 2011/0078236 A1 | 3/2011 | Olsen et al. | |
| 2011/0307788 A1* | 12/2011 | Cheung et al. | 715/731 |
| 2012/0198353 A1* | 8/2012 | Lee et al. | 715/748 |
| 2013/0069889 A1* | 3/2013 | Pearce et al. | 345/173 |

OTHER PUBLICATIONS eBeam Engage, Amplify Learning, 2011 Luidia Inc.

Lite Show III, Wireless Presentation Adapter Model Name: INLITESHOW3, Quick Installation Guide, Version 2.0 Aug. 23, 2010.

Lite Show III, InFocus, Bright Ideas Made Brillian, Wireless connect with any display, Flexible and Secure-Easy Setup Seamless High Resolution.

Cisco WebEx Meeting Center, Getting Started Guide 2011 Cisco and/or its affiliates, all rights reserved.

ProjectorPeople.com Website downloaded on Feb. 8, 212. file:///S:/51013%20Ricoh-RII/51013-006%20RII-627__FN201201129/Formal/IDS/Projector%20People%20%20%20Wireless%20Projectors.htm.

* cited by examiner

NETWORK ACCESSIBLE PROJECTORS THAT DISPLAY MULTIPLE CLIENT SCREENS AT ONCE

FIELD OF THE INVENTION

The invention relates to the field of presentation devices, and in particular, to projectors.

BACKGROUND

In an office environment, meetings (e.g., in a conference room or other location) are typically utilized in order to disseminate information among group members, to generate new ideas for upcoming projects, to schedule timelines, etc. While meetings are useful in that they allow a presenter to provide information to an entire group of people at once, they are subject to a number of undesirable characteristics. First, simply scheduling a meeting for many people may be a burden. If those people show up late or leave early, the effective time that a presenter has to present their ideas is reduced. Further amplifying the issue, if the presenter has a digital presentation, technical problems such as software and/or hardware compliance issues may occur when the presenter attempts to link their laptop or other device with a digital projector. These problems may take several minutes of time to resolve or may take much longer. This in turn interrupts the flow of the meeting and further reduces the amount of time available for presenting. Compounding the issue, time is not only wasted for the presenter while the technical issue is resolved, but also for every meeting attendee (who sits idly by as the technical issue is resolved).

The technical problems described above are also amplified in an environment where multiple individuals each wish to provide a digital presentation during the same meeting. Each presenter may encounter a different technical issue with the projector, which in turn further reduces the time during which the meeting is productive.

To address these problems, a number of different products have been created. For example, certain devices act as adapters coupled to the projector, and these adapters attempt to make it easier for a user to connect a laptop to the projector (e.g., via a wireless access point instead of via some sort of video cable). However, these adapters are yet another piece of hardware for the meeting room which must be configured before a meeting can be started. Further, these adapters may or may not be compatible with the projector that resides within the meeting room. Thus, instead of resolving the technical compatibility issues associated with projectors, these adapters simply move the problem from the interface between the projector and a laptop to an interface between the projector and adapter.

Thus, meeting attendees and presenters continue to desire projectors and meeting systems that streamline the presentation process and also enhance collaboration between individuals.

SUMMARY

Embodiments described herein include enhanced projectors that provide client software allowing for multiple network devices to operate the projector. These multiple network devices may operate the projector using the client software at substantially the same time. Thus, the projector may display presentations from multiple presenters at once. Further, in some embodiments the projector may manage multiple feeds of image data from multiple clients at the same time, which allows attendees to switch presentations seamlessly with the click of a button. This eliminates the need to unplug a previous presenter's laptop, find an adapter for a new presenter's laptop, plug the new presenter's laptop into the projector, resolve technical issues, etc.

One embodiment is a system for provisioning, via a projector, client software for accessing the projector from a network. The projector includes a light emitting unit that projects visible light representing image information onto a screen, a network interface, and a control unit. The control unit provides client software to network devices that enables the network devices to interact with the projector, receives input via the network interface from the client software operating on multiple network devices, processes the input from the client software to generate image information for the light emitting unit, and provides the generated image information to the light emitting unit for projection onto the screen.

Another embodiment is a method. The method includes providing, via a network interface of a projector, client software to network devices that enables the network devices to interact with the projector. The method includes receiving, via the network interface, input from client software operating on multiple network devices. The method also includes processing the input from the client software to generate image information for a light emitting unit of the projector, and projecting, via the light emitting unit, visible light representing the generated image information onto a screen.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
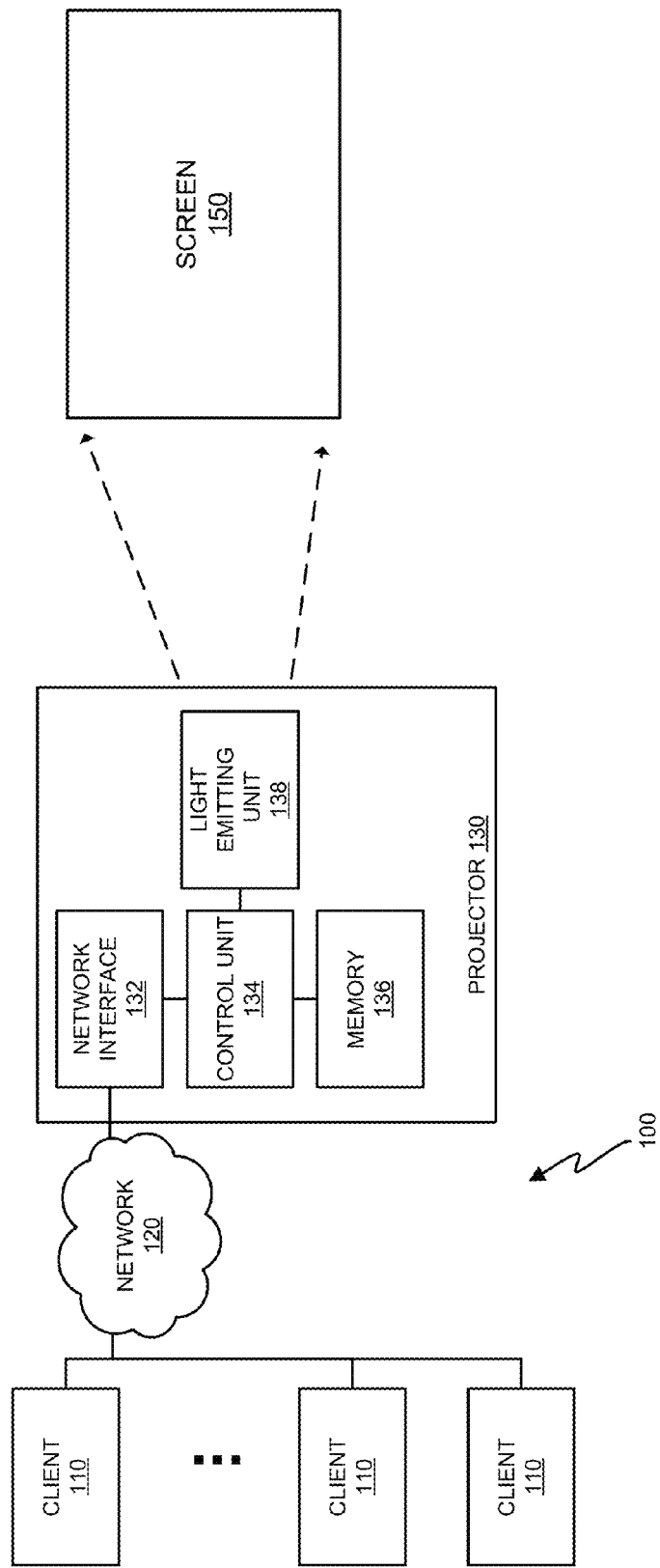
FIG. 1 is a block diagram of a projector managing multiple clients via a network in an exemplary embodiment.

FIG. 1 is a block diagram 100 of a projector 130 managing multiple clients 110 via a network 120 in an exemplary embodiment. Projector 130 projects visible light images onto a physically distinct screen such as screen 150 during presentations, and may be used, for example, to display charts, graphs, and other visual information to a room of attendees. Projector 130 is enhanced to provide client software via a network interface 132, and this client software enables network devices to access and manipulate the output of projector 130. Without this client software, clients 110 would not be capable of fully interacting with projector 130 via network 120. Furthermore, projector 130 is enhanced to provide the client software without resorting to traditional installation processes (e.g., updating registry entries, activating a dedicated installer program, asking for user interaction, etc.).

Projector 130 is further enhanced to manage multiple clients 110 at once. For example, projector 130 may allow clients 110 to simultaneously present different sets of image data onto screen 150. Additionally, because clients 110 provide input via network 120 instead of a specialized hardware video connection, clients 110 are less likely to encounter technical issues in connecting with projector 130.

Clients 110 comprise any systems, components, or devices capable of interacting with projector 130. In this embodiment, clients 110 comprise network devices (e.g., computers, laptops, tablets, smart phones, etc.) utilizing a hardware processor to implement programmed instructions for providing image data to projector 130 via network 120. Specifically, these network devices utilize the client software provided by projector 130 in order to provide image data to projector 130. Thus, as used herein, a "client" or "client device" typically refers to a network device implementing client software provisioned by projector 130. In one embodiment, the client software may utilize a custom application layer protocol residing atop TCP/IP transport layer communications performed via network 120. In a further embodiment, the client software may be provisioned and enabled (e.g., via a browser) without the need for traditional installation processes such as updating a system registry, operating an installer package, asking a user for a location to install the software, etc. The client software may be programmed according to an Operating System (O/S) independent language such as Java (e.g., in accordance with Java SE 7, released Jul. 28, 2011). While three clients 110 are depicted in FIG. 1, the number and type of clients 110 communicating with projector 130 may vary over time, and may vary as a matter of design choice. Furthermore, in some embodiments each client 110 may be capable of communicating with one or more enhanced projectors 130.

Network 120 comprises any packet-switched network capable of carrying communications between multiple clients 110 and projector 130. In one embodiment, network 120 utilizes the TCP/IP protocol to implement transport-layer communications between projector 130 and clients 110. Network 120 may further comprise any combination of wireless and/or wired components for implementing routing functions between networked components.

Projector 130 comprises network interface (I/F) 132, control unit 134, memory 136, and light emitting unit 138. In some embodiments, instead of projector 130, control unit 134, memory 136, and network I/F 132 utilize a display such as a television, a monitor, a set of monitors, or a display (e.g., a flat panel display). Network I/F 132 may comprise an Ethernet connection, a Wireless Access Point (WAP) or other component compatible with one or more of the IEEE 802.11 protocols, etc. Network I/F 132 is operable to receive input from clients 110 via network 120, and to provide this input to control unit 134 for processing. Control unit 134 comprises any system, component, or device operable to manage the operations of projector 130. In this embodiment, control unit 134 comprises a general purpose processor and/or customized circuitry for implementing programmed instructions in a memory to generate image information displayed via light emitting unit 138. Memory 136 comprises any component or device operable to store digital information (e.g., optical memory, magnetic recording media, solid state memory, etc.). Memory 136 stores instances of client software that may be provided to network devices in order to turn those network devices into clients 110. In further embodiments, memory 136 may additionally store bootstrap software used to provision the client software onto a given client 110.

Light emitting unit 138 comprises any system, component, or device operable to project visible light onto screen 150 (which is not integral with projector 130). For example, light emitting unit 138 may "throw a beam" by utilizing projection technologies such as Liquid Crystal Display (LCD) projection (e.g., utilizing LCD light gates), Digital Light Processing (DLP) projection, Liquid Crystal on Silicon (LCoS) projection, Light Emitting Diode (LED) projection, laser diode projection, and other technologies. Light emitting unit 138 is capable of projecting sufficient visible light to illuminate physically distant screen 150 with image information provided by control unit 134.

Screen 150 comprises any surface capable of receiving projected light from light emitting unit 138 of projector 130. Typically, screen 150 will be physically uniform and substantially flat. Furthermore, screen 150 will typically comprise a uniform color (e.g., white, cream, etc.) upon which an image may be projected and will also be opaque. These properties of screen 150 may enhance viewing properties of a presentation shown via projector 130.

Using projector 130, users of clients 110 may seamlessly transition between being an audience member and being a presenter in a meeting. Furthermore, multiple users may simultaneously present at once utilizing the client software provided by projector 130. As an additional benefit, in some embodiments, because the client software is provided by projector 130 via network 120, conventional browsers used by network devices may be used to download/provision the client software.

Further details of the operation of projector 130 will be discussed with regard to FIG. 2. Assume, for this embodiment, that projector 130 initializes while connected to network 120, detects network 120, and receives a network address (e.g., an IP address, Uniform Resource Locator (URL), etc.) from network 120 indicating the location of projector 130. Further, assume that a group of users wishes to connect with projector 130 in order to initiate a meeting, but these users have not yet acquired client software from memory 136 for use on their network devices.

Figure 2:
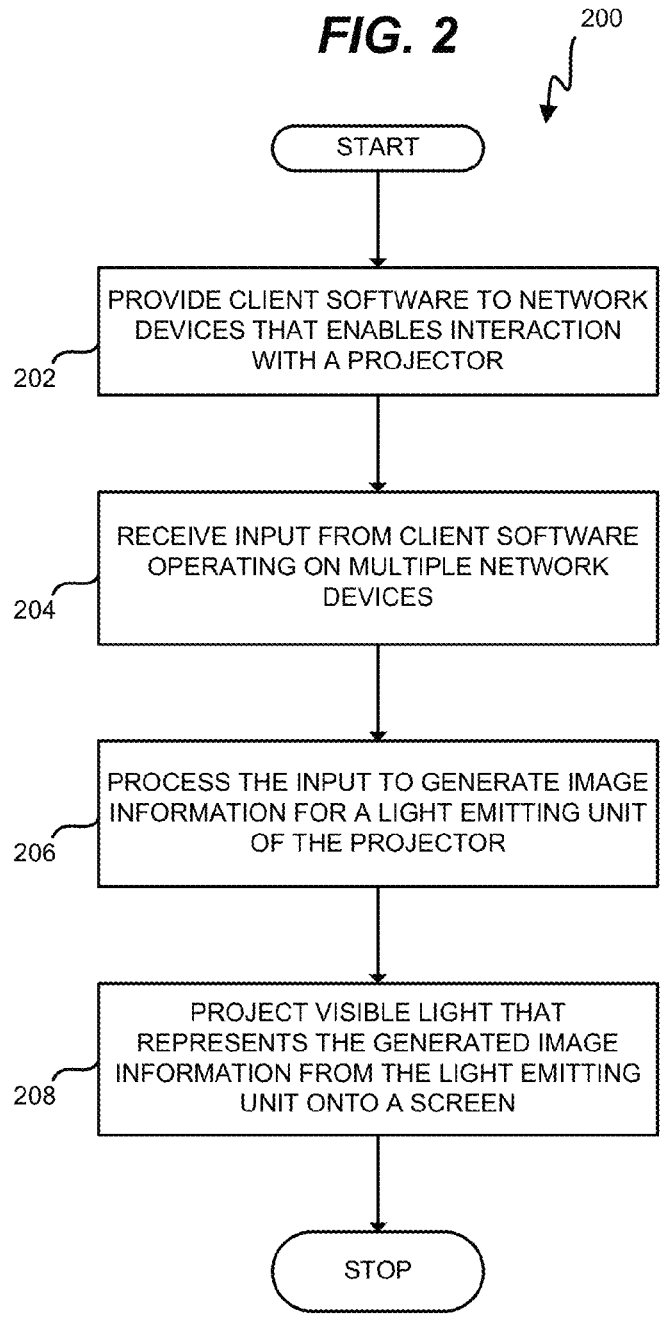
FIG. 2 is a flowchart illustrating a method for operating a projector in an exemplary embodiment.

FIG. 2 is a flowchart illustrating a method 200 for operating a projector in an exemplary embodiment. The steps of method 200 are described with reference to projector 130 of FIG. 1, but those skilled in the art will appreciate that method 200 may be performed in other systems or devices. The steps of the flowcharts described herein are not all inclusive and may include other steps not shown. The steps described herein may also be performed in an alternative order.

In step 202, control unit 134 provides client software to network devices via network 120. This client software enables the network devices to communicate with and control projector 130. In one embodiment, the client software may be provided by control unit 134 when control unit 134 generates and hosts a browser-accessible web page or other network address (e.g., an FTP location) from which the client software may be acquired. In order to inform meeting participants of the available client software, control unit 134 may instruct light emitting unit 138 to project the network address for projector 130 onto screen 150 upon startup. In one embodiment, the network address is continuously displayed at screen 150 (e.g., at a prominent location when no meeting is in session, and/or at a discreet location such as a corner of screen 150 during a meeting). In this manner, users entering the meeting room that houses projector 130 may immediately discover the appropriate network location to acquire the client software from, even if the meeting is already in session. Once a user directs their browser to the network address of projector 130, control unit 134 may be further operable to initiate a Java Runtime Environment (JRE) within the browser, and to load and link the client software at run-time as a program within the JRE (thus, no reboot of the client device is necessary). This step may be duplicated at projector 130 each time a new network device contacts projector 130. Therefore new clients may be added even during the middle of a meeting without interrupting projector 130.

In step 204, control unit 134 receives input from the client software operating on multiple network devices (i.e., control unit 134 receives input from each of multiple clients, each client comprising a network device implementing an instance of the client software). This input is received via network I/F 132. For each client, this input may include image data such as a screenshot of a display of the client. In one embodiment, clients implemented on mobile devices such as tablets or smart phones do not provide screenshots, but rather provide image data such as images stored in memory, a live feed from a camera, a display from a web browser, etc. This image data may be uncompressed image data (e.g., a .PNG file) or compressed image data (e.g., a JPEG file), and may be downscaled by the client if the resolution of the client is greater than the resolution of projector 130. This input may further include instructions to make the client a "presenter" or may include a request to receive a screenshot of screen 150.

In step 206, control unit 134 processes the input from the clients to generate image information for light emitting unit 138. The generated image information will typically comprise a large image having multiple software windows (i.e., defined portions), one window for each client providing input to projector 130. To populate windows of the large image with image data from the clients, control unit 134 may proceed to analyze received client input and acquire the image data stored therein. Each piece of image data provided by the clients may be scaled and/or positioned by control unit 134 based upon the size and/or position of an associated client window. This process may also include accounting for overlapping windows, layered windows, window opacity, etc. Additionally, the scaling may be performed in a manner to ensure that the aspect ratio of the image data is preserved when it is presented at the window. Further, depending upon the optics used by projector 130, the generated image information constructed by control unit 134 for projection may be a mirror image of the image presented to users at screen 150.

In step 208, light emitting unit 138 projects visible light that represents the generated image information onto screen 150. This action is performed based upon instructions provided by control unit 134. Control unit 134 may be further operable to adjust the intensity/brightness of light emitting unit 138 in order to account for the current light level within the meeting room.

Utilizing method 200, users of clients 110 may seamlessly transition between being an audience member and being a presenter in a meeting utilizing projector 130. Furthermore, multiple users may simultaneously present at once via projector 130. As an additional benefit, in some embodiments, because client software is provided by projector 130 via network 120, conventional browsers residing at network devices may be used to load/provision the client software.

In a further embodiment, a user may be presenting at screen 150 (e.g., via a pointing device such as a pen, finger, remote, laser pointer, etc.), and may send a request (e.g., via the pointing device or via a hardware button at projector 130) to send a screenshot of screen 150 to clients currently engaged in a session with projector 130. Control unit 134 may then transmit the assembled image data projected to screen 150 to multiple clients via network 120.

In a further embodiment, a client may send a request to control unit 134 for a screenshot of screen 150. Control unit 134 may then transmit the assembled image data for screen 150 to the requesting client.

In a further embodiment, control unit 134 may provide certain clients (e.g., mobile and/or handheld devices) with a continuous copy of the generated image information being projected onto screen 150. Thus, these select clients view a duplicated version on a display of their device that matches the content presented at screen 150. In a still further embodiment, such clients (e.g., mobile and/or handheld devices) may mark on their displays and have these marks duplicated at screen 150.

In another embodiment, control unit 134 may detect that a client has failed to provide image data for a specified period of time (i.e., a client may be "idle" if, for example, it has not transmitted image data for a period of about forty five seconds). In such circumstances, control unit 134 may close a session with the client by closing the associated window and no longer manipulating projector 130 based upon input from the client. The client may later detect that the session has closed (e.g., based upon a response from control unit 134 indicating the session has closed, or based upon silence from control unit 134). Based upon this information, the network device may remove the client software from the network device (but may keep the bootstrap software), thereby freeing resources at the network device.

EXAMPLES

In the following examples, additional processes, systems, and methods are described in the context of an enhanced projector that provides client software to network devices.

Figure 3:
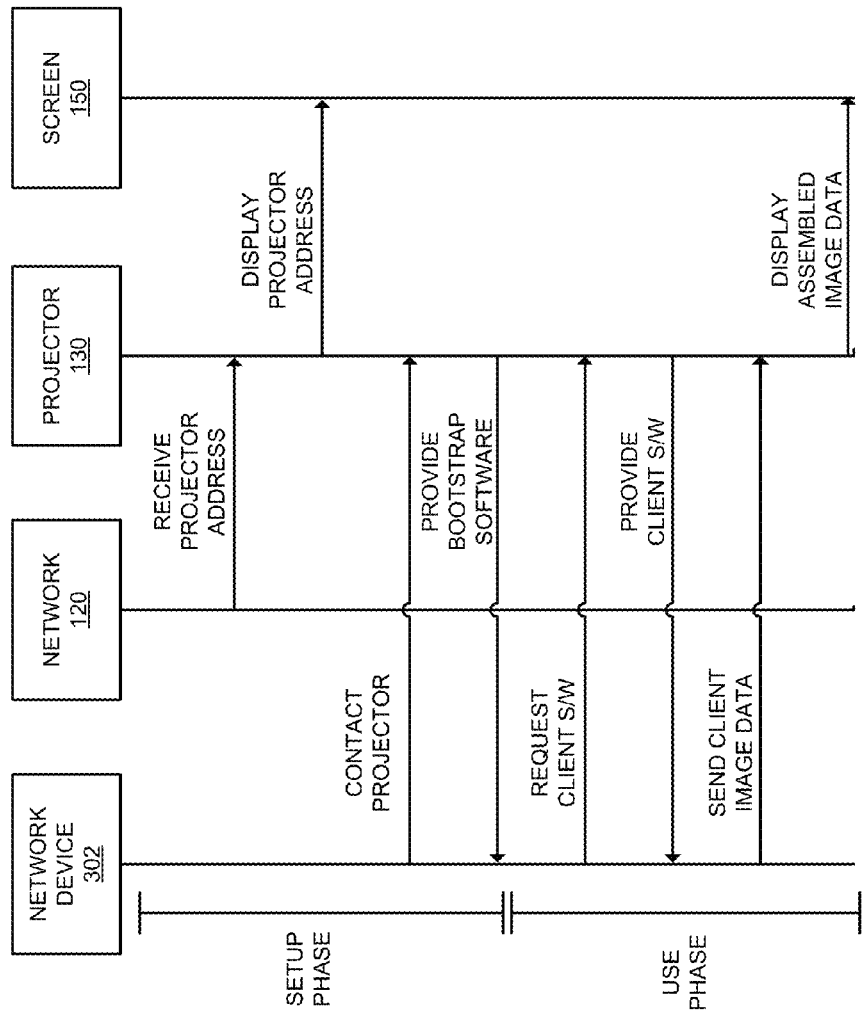
FIG. 3 is a process diagram illustrating a flow of communications between a projector and a network device in an exemplary embodiment.

FIG. 3 is a process diagram illustrating a flow of communications between a projector and a network device 302 in an exemplary embodiment. According to FIG. 3, these communications are broken up into a setup phase, wherein network device 302 performs first time setup, and a use phase, wherein network device 302 may initiate and terminate meetings at projector 130. According to FIG. 3, in the setup phase, projector 130 initializes, acquires a network address from network 120, and projects the network address for projector 130 onto screen 150. This network address may, for example, be determined based upon negotiations between projector 130 and network 120 at start-up. Next, a user enters the room in which projector 130 is operating, and notices the displayed projector address. The user activates network device 302 and navigates a browser of network device 302 to the address of projector 130.

Upon detecting that a browser is requesting information from projector 130, projector 130 is operable to provide, via an internal web server, "bootstrap" software to the browser. The bootstrap software may, for example, comprise a .JAR file compliant with Java. In one embodiment, the bootstrap software will be provisioned via a webpage including instructions for contacting projector 130. The instructions include a link to the bootstrap software program. When a user clicks on the link, the bootstrap software is downloaded to memory of the user's network device. This bootstrap software may perpetually reside at network device 302 until intentionally removed (e.g., by a user, administrator, automated process, etc.), and may include information used to dynamically load client software from the projector 130 and link the client software (for manipulating projector 130) each time the use phase is iterated. Thus, the bootstrap software may be kept on network device 302 between meetings (e.g., between use phases) and is not tied to a particular projector. The bootstrap software may further be used regardless of the type of projector or projector version used. Keeping the bootstrap software at network device 302 between use phases allows for speedy re-loading and linking of the client software. Additionally, utilizing the bootstrap software may, for example, ensure that each time network device 302 interacts with projector 130, network device 302 utilizes the latest version of the client software available from projector 130.

With the bootstrap software successfully acquired, the setup phase has been completed. Thus, network device 302 enters the use phase. According to the use phase, the bootstrap software uses stored configuration information to acquire the client software. This information may include, for example, the network address of projector 130 as well as a specific port at which to contact projector 130. In one embodiment, the bootstrap software displays a field with the network address of projector 130 (or whatever projector was most recently contacted), and enables a user to enter another projector's network address. In another embodiment, the bootstrap software detects network addresses of projectors in the vicinity, from which the user can select. Next, network device 302, through the bootstrap software, requests acquisition of the client software. The client software is then provisioned to network device 302 from projector 130. The client software and bootstrap software may both comprise 0/S independent run-time software such as Java software. This may enhance the variety of network devices that can utilize projector 130, and may further speed up the process by which the client software is loaded and linked.

In a further embodiment, the client software establishes one or more connection(s) to projector 130 (e.g., via one or more ports). The connection(s) may be used to manage interaction with projector 130. For example, the connection(s) may send image data to the projector, receive responses from the projector, receive events from the projector, etc.

In an alternative embodiment, each client may broadcast its existence on network 120. Projector 130 (and/or other projectors) may then detect clients available via network 120, and then report their existence and address to the detected clients.

Once the client software is up and running at network device 302 (thereby turning network device 302 into a client), the client software establishes a session with projector 130. Establishing a session may be a simple matter of contacting projector 130, at which time projector 130 generates a window for receiving image data from the client. Projector 130 may further provide a confirmation to the client indicating that the session has been established. Once the session has been established, client software operating on network device 302 may use software functions to acquire image data (e.g., screenshots of a display) of network device 302 on a periodic basis. For example, the image data may be acquired a few times per second.

Next, network device 302, via the client software, is capable of providing the image data to projector 130 via network 120. This image data may be provided, for example, continuously or periodically. Projector 130 receives this data and integrates it into a window for display. The window is updated with the image data (which may be scaled or positioned to fit within the window). A similar process occurs with other clients currently engaging in a session with projector 130. In this manner, image data from many clients may be assembled into one large image. The assembled image data is then sent to a light emitting unit of projector 130, which projects the assembled image data onto screen 150 for viewing.

In a further embodiment, the bootstrap software at a client may determine that a user has finished using the client software (e.g., by closing a browser window associated with the client software, closing the client software, indicating that the client software should stop sending image data, etc.). After the user has finished using the client software, the bootstrap software may remove the client software to free up resources at network device 302.

Figure 4:
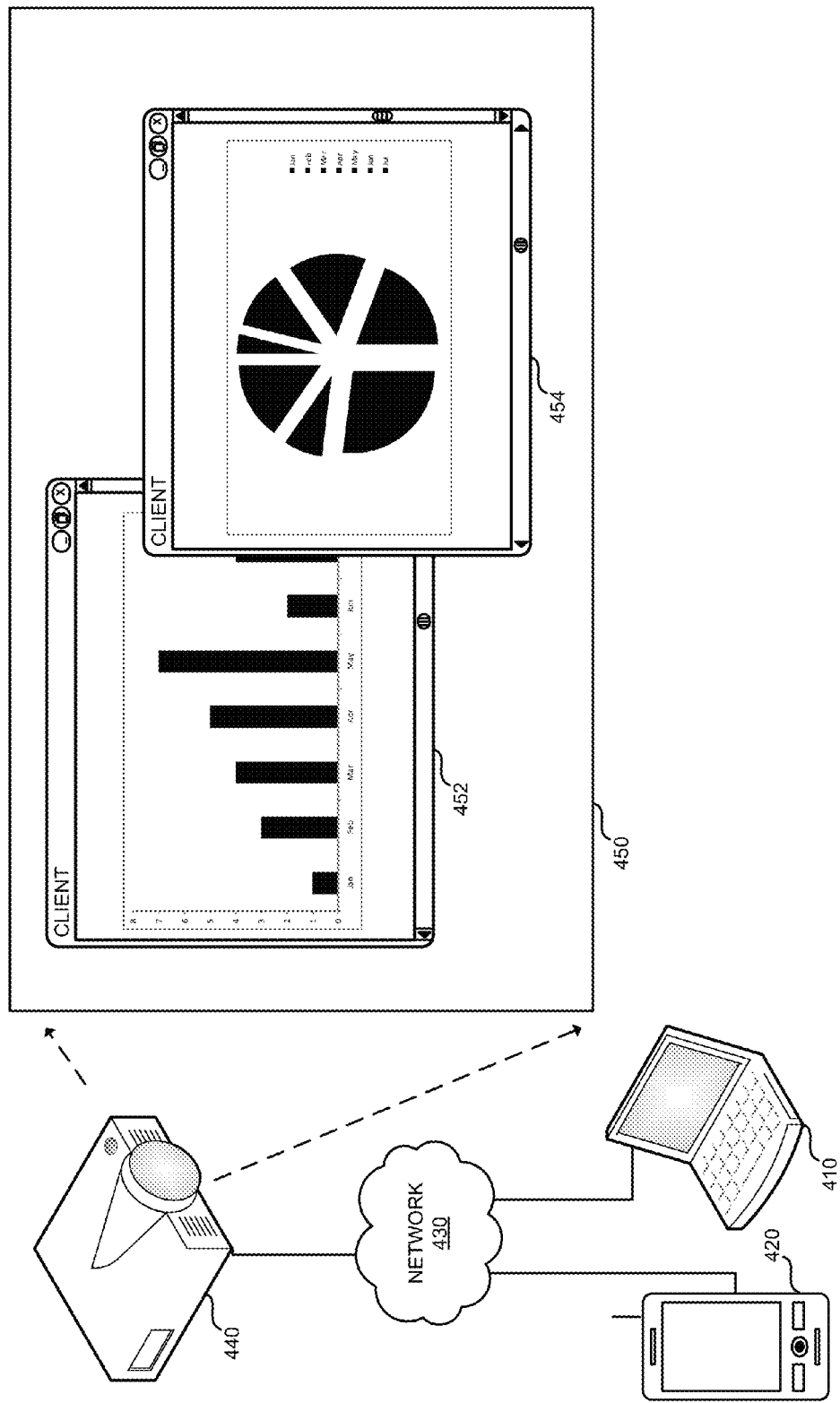
FIG. 4 is a block diagram of multiple clients presenting onto a screen via a projector in an exemplary embodiment.

FIG. 4 is a block diagram of multiple clients presenting onto a screen via a projector in an exemplary embodiment. According to FIG. 4, laptop 410 and smart phone 420 utilize network 430 to communicate with projector 440. Projector 440 receives image data from each of laptop 410 and smart phone 420, and populates screen 450 with two separate client windows. Assume, for this embodiment, that originally laptop 410 was the only client connected with projector 440. Laptop 410 sent image data to projector 440, and was assigned window 452 by projector 440. Projector 440 placed the received image data at window 452, scaled and centered such that it occupied all of screen 450. Next, smart phone 420 connected to projector 440, which resulted in scaling and repositioning window 452 to make room for window 454. Window 454 represents the screen of smart phone 420. Thus, multiple presenters may present at once in order to streamline collaboration between meeting attendees.

Figure 5:
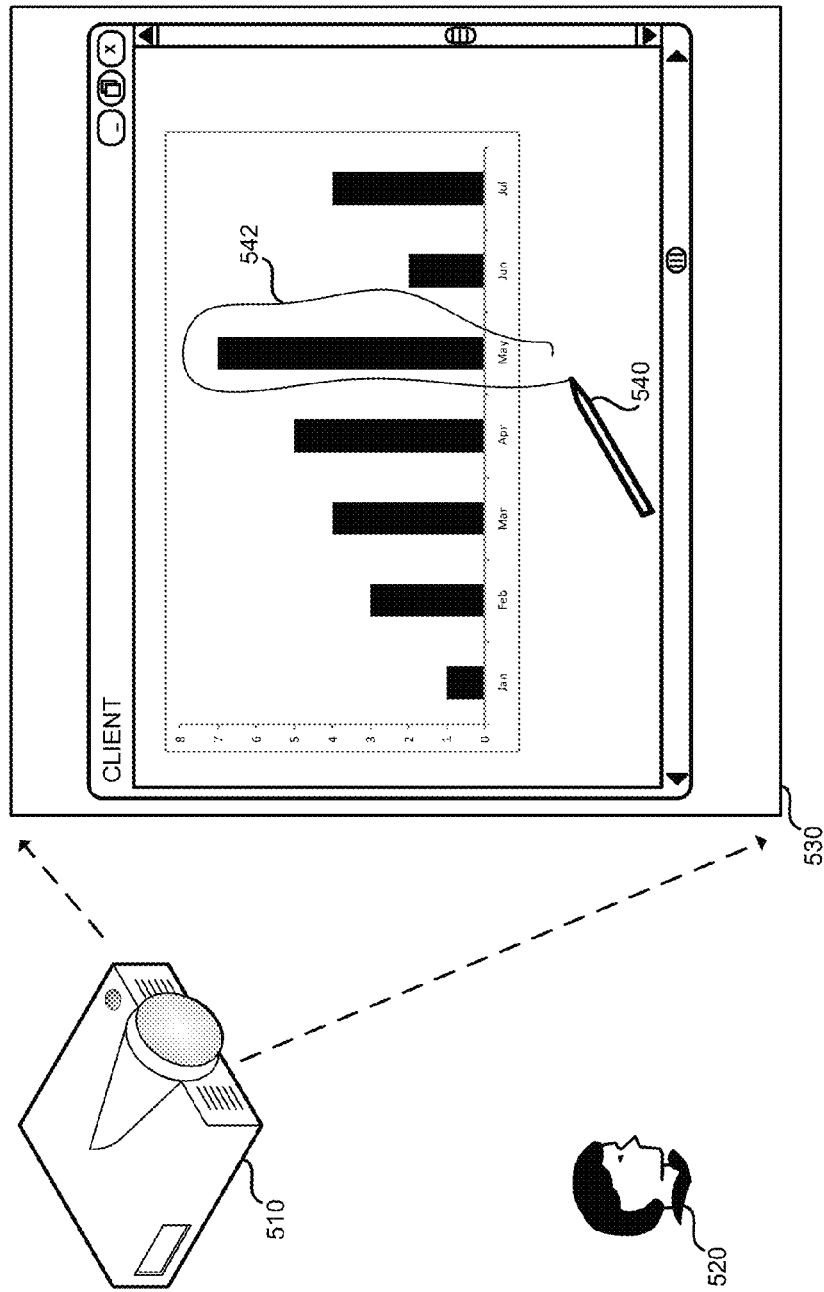
FIG. 5 is a block diagram of a presenter using a pointing device to digitally mark a presentation in an exemplary embodiment.

FIG. 5 is a block diagram of a presenter 520 using a pointing device 540 to digitally mark a presentation in an exemplary embodiment. According to FIG. 5, projector 510 projects a presentation onto screen 530. Presenter 520 utilizes a pointing device (e.g., a remote transmitter, a pen, a finger, etc.) to indicate locations at screen 530. Projector 510 is enhanced in order to track the indications, and to create marks on the presentation based upon the indications. For example, a control unit of projector 510 may add the markings directly to generated image data for projector 510 in order to display the indicated areas as lines, highlighting, shapes, etc. In short, presenter 520 indicates an area of the screen using pointing device 540, and projector 510 identifies the indicated area. Projector 510 then alters projected image information so that the indicated area is marked on screen 530. In further embodiments, the markings may be "tied" or otherwise associated with a specific window at screen 530, such that if the window is resized or re-positioned, the markings are treated similarly. This may be particularly useful when presenter 520 wishes to highlight or otherwise draw attention to a specific region of the window.

In further embodiments, the marks applied by the pointing device may vary based upon a series of interaction tools displayed at the bottom of screen 530. Such tools may comprise, for example, images of markers of varying colors. By selecting one of several markers (or other tools) with the pointing device, a different color or operation may be performed upon the screen by the pointing device. In a further embodiment, an active marker may be indicated by removing an image of a cap from the active marker.

The pointing device may further be used to transmit commands to projector 510. For example, the projector may note certain locations at screen 530 as "hotspots" (i.e., controls projected onto screen 530. These hotspots may include, for example, buttons for maximizing or minimizing a window for a client. By indicating the location of the buttons with the pointing device, presenter 520 may provide context-sensitive instructions to projector 510. Thus, upon touching one hotspot, presenter 520 could cause projector 510 to minimize a given window, while by touching another hotspot, presenter could maximize a given window. Further hotspots could allow for cascading or tiling multiple windows, and other functions.

Any number of known technologies may be used to implement and track the pointing device. For example, the pointing device may be an Epson BRIGHTLINK device, a Luidia E-BEAM device, a device defined according to U.S. Pat. No. 6,437,314, and/or other devices.

Figure 6:
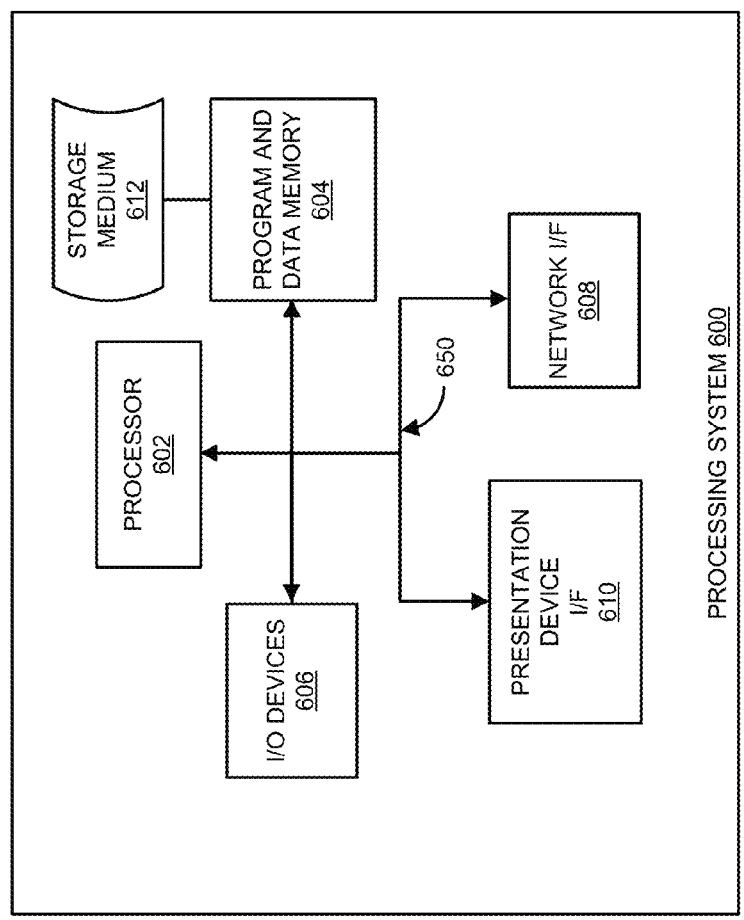
FIG. 6 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of projector 130 to perform the various operations disclosed herein. FIG. 6 illustrates a processing system 600 operable to execute a computer readable medium embodying programmed instructions to perform desired functions in an exemplary embodiment. Processing system 600 is operable to perform the above operations by executing programmed instructions tangibly embodied on computer readable storage medium 612. In this regard, embodiments of the invention can take the form of a computer program accessible via computer-readable medium 612 providing program code for use by a computer or any other instruction execution system. For the purposes of this description, computer readable storage medium 612 can be anything that can contain or store the program for use by the computer.

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be integrated with the system to interface to one or more presentation devices, such as printing systems and displays for presentation of presentation data generated by processor 602.

Although specific embodiments were described herein, the scope of the invention is not limited to those specific embodiments. The scope of the invention is defined by the following claims and any equivalents thereof.

We claim:

1. A system comprising:
a display operable to present image information to a user;
a network interface; and
a control unit operable to provide client software to network devices that enables the network devices to interact with the system,
the control unit further operable to receive input via the network interface from the client software operating on multiple network devices, to process the input from the client software to generate image information for the display, and to provide the generated image information to the display,
wherein the generated image information comprises multiple windows that each represent a screenshot of a network device operating the client software,
the system is a projector,
the display comprises a light emitting unit operable to project visible light representing image information onto a screen, and
the control unit is further operable to process the input from the client software to generate image information for the light emitting unit, and to provide the generated image information to the light emitting unit for projection onto the screen.

2. The system of claim 1 wherein
the light emitting unit utilizes one or more techniques selected from the group consisting of Liquid Crystal Display (LCD) projection, Digital Light Processing (DLP) projection, Liquid Crystal on Silicon (LCoS) projection, Light Emitting Diode (LED) projection, and laser diode projection.

3. The system of claim 1 wherein:
the control unit is further operable to process the input provided by the client software to identify image data that represents a screenshot, to scale and position the image data from the client software based upon a location and a size of a window for a network device operating the client software, and to populate the generated image information with the scaled and positioned image data.

4. The system of claim 3 wherein:
the control unit is further operable to receive input that comprises commands for altering at least one of the size and the location of a window.

5. The system of claim 3 wherein:
the control unit is further operable to detect that the client software at one of the multiple network devices has become idle, and to close a window for the idle client software.

6. The system of claim 1 wherein:
the control unit is further operable to provide bootstrap software to the network devices that is operable to acquire the client software from the control unit, to provide the client software to a network device, and to remove the client software from the network device.

7. The system of claim 6 wherein:
the bootstrap software and the client software each comprise Java software.

8. The system of claim 1 wherein:

the control unit is further operable to track a position of a pointing device along the screen, and to alter the image information projected onto the screen based on the position.

9. The system of claim 8 wherein:

the pointing device provides functions for at least one of drawing on the screen, highlighting on the screen, and manipulating controls projected onto the screen.

10. The system of claim 8 wherein:

the control unit is further operable to provide the generated image information to each network device operating the client software responsive to receiving a request indicated by the pointing device.

11. The system of claim 1 wherein:

the control unit is further operable to instruct the light emitting unit to display a network address for the projector indicating a location from which the client software can be acquired.

12. A method comprising:

providing, via a network interface of a meeting system, client software to network devices that enables the network devices to interact with the meeting system, receiving, via the network interface, input from client software operating on multiple network devices;

processing the input from the client software to generate image information for a display of the meeting system; and presenting, via the display, the generated image information, wherein the generated image information comprises multiple windows that each represent a screenshot of a network device operating the client software, wherein the meeting system is a projector;

the display comprises a light emitting unit operable to project visible light representing image information onto a screen;

processing the input from the client software comprises generating image information for the light emitting unit of the projector; and presenting the generated image information comprises projecting, via the light emitting unit, visible light representing the generated image information onto a screen.

13. The method of claim 12 wherein:

presenting the generated image information is performed via one or more techniques selected from the group consisting of Liquid Crystal Display (LCD) projection, Digital Light Processing (DLP) projection, Liquid Crystal on Silicon (LCoS) projection, Light Emitting Diode (LED) projection, and laser diode projection.

14. The method of claim 12 wherein:

processing the input comprises:

identifying image data that represents a screenshot;

scaling and positioning the image data from the client software based upon a location and a size of a window for a network device operating the client software; and populating the generated image information with the scaled and positioned image data.

15. The method of claim 14 wherein:

the input comprises commands for altering at least one of the size and the location of a window.

16. The method of claim 14 further comprising:

detecting that the client software at one of the multiple network devices has become idle; and closing a window for the idle client software.

17. The method of claim 12 wherein:

providing the client software comprises:

providing, via the network interface, bootstrap software to the network devices that is operable to acquire the client software from the projector and also to remove the client software; and providing, responsive to receiving a request from bootstrap software operating on a network device, the client software to the network device.

18. The method of claim 17 wherein:

the bootstrap software and the client software each comprise Java software.

19. The method of claim 12 further comprising:

tracking a position of a pointing device along the screen; and altering the image information projected onto the screen based on the position.

20. A non-transitory computer readable medium embodying programmed instructions which, when executed by a processor, are operable for performing a method comprising:

providing, via a network interface of a meeting system, client software to network devices that enables the network devices to interact with the meeting system, receiving, via the network interface, input from client software operating on multiple network devices;

processing the input from the client software to generate image information for a display of the meeting system; and presenting, via the display, the generated image information, wherein the generated image information comprises multiple windows that each represent a screenshot of a network device operating the client software, wherein the meeting system is a projector;

the display comprises a light emitting unit operable to project visible light representing image information onto a screen;

processing the input from the client software comprises generating image information for the light emitting unit of the projector; and presenting the generated image information comprises projecting, via the light emitting unit, visible light representing the generated image information onto a screen.

* * * * *